UNITED STATES PATENT OFFICE.

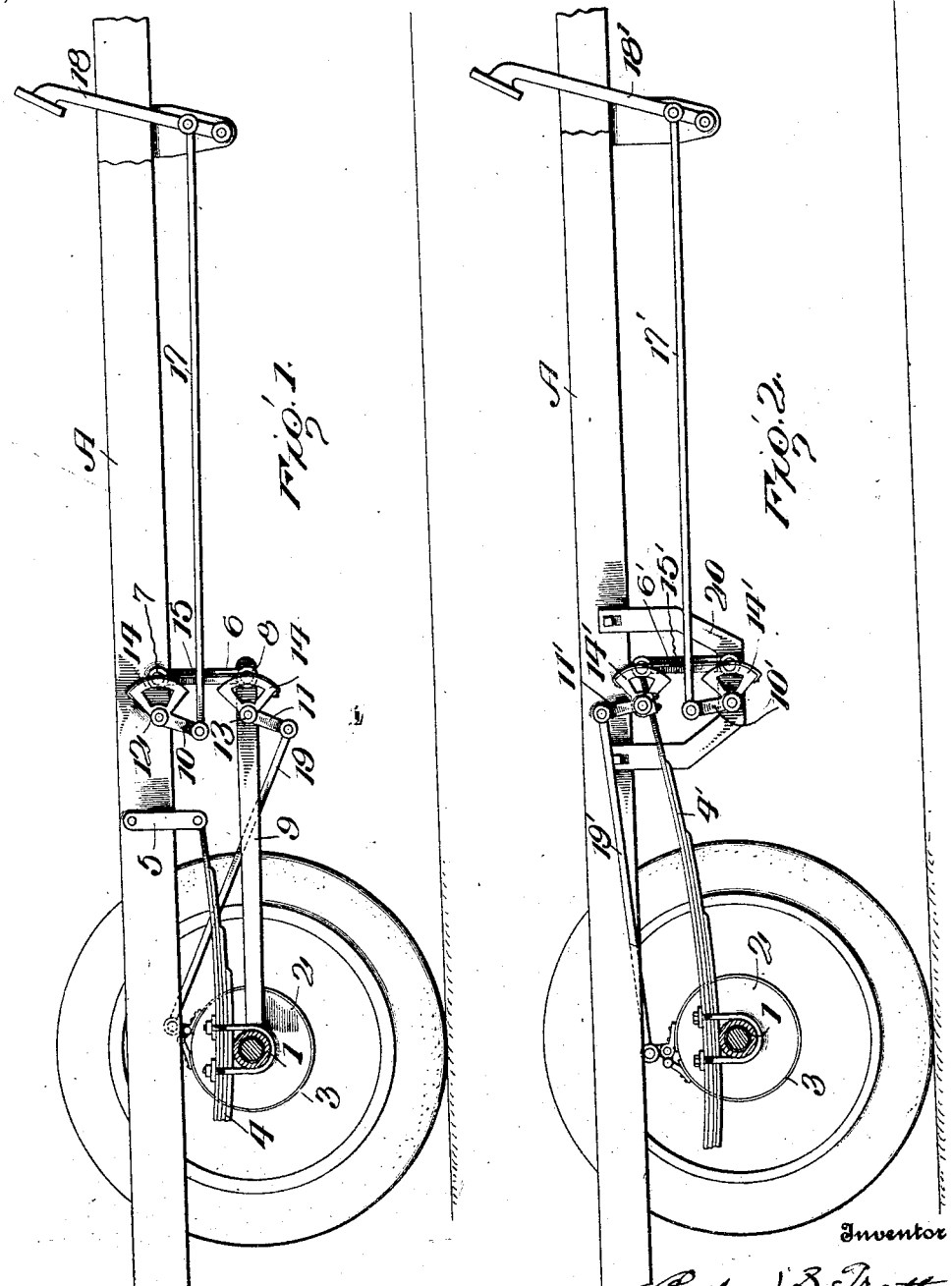

ROLLAND S. TROTT, OF DENVER, COLORADO.

BRAKE CONTROL.

1,199,323.

Specification of Letters Patent.  Patented Sept. 26, 1916.

Application filed March 24, 1915. Serial No. 16,669.

*To all whom it may concern:*

Be it known that I, ROLLAND S. TROTT, a citizen of the United States, residing in the city and county of Denver and State of Colorado, have invented certain new and useful Improvements in Brake Controls, of which the following is a specification.

My invention relates to an improvement in brake controls, the object being to provide means to operate the hub brakes on a car provided with a spring suspension that allows horizontal movement of the axle or axles; and to provide a brake control that will be entirely unaffected by the horizontal axle movements.

The advantages of this invention are that it leaves the brakes entirely unaffected by axle movements, and this is accomplished with a minimum of cost and weight, and at the same time without departing radically from the present day brake constructions.

This invention consists of a link pivoted on the frame and to a member that is attached to the axle so that one end of the link travels horizontally with the frame, and the other end of the link horizontally with the axle, and the member attached to the axle may be either a load spring or a rod, and on which member is mounted a bell crank comprising an ordinary lever arm and a segment in the arc of a circle for the other arm. The segment of this circle is in line with the center of the pivot pin, joining the link with the axle member, and on the frame is pivoted a similar bell crank, the arc of its segment being in line with the center of the pivot pin joining the link to the frame. The axle member bell crank is joined to the brake lever on the rear axle by the usual rod, and the bell crank on the frame is joined in the usual manner by a rod to the pedal or hand-brake lever, and a flexible device, such as a flat steel, a woven steel cable, or a chain extends from one segment to the other, so that when the brake pedal is pushed the brake is applied, and the brake is unaffected by the relative movements of the frame and axle.

In the accompanying drawings:—Figures 1 and 2 are side elevations of two forms that this invention might take.

A, represents the frame, and 1 is the axle, and 2 is the brake hub with the usual brake-band 3 surrounding it.

In the form shown in Fig. 1, the load spring 4 is connected to the frame in any approved manner, as for instance by the usual shackle 5. A link 6 is pivotally connected at 7 to the frame, and at 8 to an arm 9 extending from the axle. Bell-crank levers 10 and 11 are pivoted at 12 and 13 respectively on the frame A and the arm 9. These bell crank levers each have a segment 14 formed in the arc of a circle, and a strap of flat steel, woven steel cable, or chain 15 extends from one segment to the other as shown in the drawings, thus connecting the two segments. A rod 17 extends from the bell crank lever 10 to the brake pedal 18, and a rod 19 extends from the bell crank lever 11 to the brake-band lever.

In the form shown in Fig. 2, the lever 11' is supported upon and pivoted to the load spring 4' and the segments of the levers 10' and 11' are connected by the flat steel band 15', the lever 10' being pivoted to a bracket 20 depending from the frame A. A rod 17' extends to the brake pedal 18', and the rod 19' to the brake band 3'. When the brake pedal is pushed, the bell crank lever 10 or 10' carried by the frame is rocked, and through the flexible connection 15 or 15' connecting the segments 14, or 14', the other bell crank lever 11 or 11' is rocked, exerting a pull upon the rear axle brake. When the axle moves horizontally as much of the band, cable or chain is unwrapped from one arc as is wrapped upon the other by the swinging of the links 6 or 6'. about the frame pivot, and thus no movement is imparted to the brake control by the horizontal axle movement. At 12 there might be a shaft with one lever and two arcs; or at 13 there may be a shaft with two levers and one arc; and various other constructions may be used that are included in the scope of this invention, so I do not wish to confine myself to the exact details shown.

I claim:—

1. A brake control comprising a frame, axle, and brake mechanism connected with the axle, and means supported partly by the axle and partly by the frame flexibly connected together and controlled and operated by the brake-lever and connected with the brake mechanism.

2. A brake control comprising two levers flexibly connected together, one carried by the frame and the other by the axle of a vehicle, one connected with the brake mechanism and the other with the brake lever, whereby the action of the brake will be unaffected by the relative movement of the frame and axle with respect to each other.

3. In a brake control, the combination with a frame, axle and brake mechanism, of levers pivotally supported by the frame and axle and flexibly connected together, one lever connected with the brake and the other lever connected with the brake operating lever.

4. A brake control comprising two levers each having a segment in the arc of a circle, flexible means connecting said segments, one of said levers supported by the frame and the other by the axle of a vehicle, a brake mechanism, a brake lever, and means extending from one of said levers to the brake mechanism, and the other to the brake lever.

5. An axle, a brake lever carried by the axle, a frame, a link pivoted on the frame and to an axle member, two arm and arc bell-cranks pivoted respectively on the frame and the axle member with arc faces approximately tangent to the center line of the link, an operating lever mounted on the frame, and means connecting the operating lever and the brake lever through the bell cranks.

6. A brake control comprising an axle, an axle member, a brake lever carried by the axle, a link pivoted to the frame and to the axle member, an operating lever, means connecting the operating lever and brake lever, whereby horizontal movement of the axle will not affect the pull on the brake lever.

7. In a brake control, the combination with an axle, a brake, a frame, and load springs connected with the axle, of two levers, one carried by the frame and the other by the axle, a link pivotally connected to the frame and to the axle, a flexible connection extending from one lever to the other, and means connecting one lever to the brake and the other lever to the brake operating means.

8. A brake control comprising two segments connected together flexibly, one carried by the frame and the other by the axle of a vehicle, one connected with the brake of a vehicle, and the other with the brake mechanism, whereby the relative horizontal movement of the frame and axle will not affect the brake control.

9. In a brake control, the combination with a frame, axle and brake mechanism, of segment levers pivotally supported by the frame and axle and flexibly connected together whereby horizontal axle movement wraps the flexible connection on one segment as it unwraps from the other without moving the segments on their pivots.

10. The combination of a frame, axle, brake mechanism and control, two levers, each having a segment, flexible means connecting said segments, one of said segments pivotally supported by the frame and one by the axle so that horizontal movement between frame and axle will wrap said means upon one segment as it is wrapped off the other segment without moving either segment on its pivot.

11. The combination with a frame, axle, and brake mechanism, of means to control said brake mechanism including two segments pivotally mounted and connected by flexible means, so that horizontal axle movement causes said flexible means to wrap on one segment as it wraps off the other, and without pivotal movement of either segment on its pivot.

12. An axle, a brake lever on the axle, a frame, a link pivoted on the frame and to an axle member, two segment bell cranks pivoted respectively on the frame and the axle member, an operating lever mounted on the frame, and means connecting the operating lever and the brake lever through the bell cranks.

13. In a brake control two pivoted segments, and a flexible connection extending from one to the other so that the movement of one about the other unwraps said connection from one as it wraps upon the other, without pivotal movement of either segment on its pivot.

14. In a brake control, two pivoted segments connected by a flexible connection so that movement of one segment about the other unwraps the said connection from one as it wraps upon the other, without moving either segment on its pivot, and means connecting the segment to parts to be operated and to operating parts.

15. In a brake control, the combination with an axle, a brake, a frame, and load springs connected with the axle, of two levers, one carried by the frame and the other by the axle, a link pivotally connected to the frame and to the axle means connecting one lever to the brake and the other lever to the brake operating means, and means connecting the two levers whereby the operating force may be transmitted, but horizontal movement of the axle and frame will not move the lever on their pivots.

16. In a brake control, the combination of a frame, an axle movable vertically and horizontally with respect to the frame, brake mechanism and brake control connected with axle and frame respectively, and means connected together and connected to each, one supported by the frame and the other by the axle.

17. In a brake control, the combination of a frame, an axle, a spring secured to the axle and having a linked connection with the frame, whereby the axle is capable of horizontal movement, brake mechanism and brake control, and two connected means pivotally supported by the frame and by the axle, one of said means connected with the brake mechanism and the other with the control.

In testimony whereof I affix my signature.

ROLLAND S. TROTT.